United States Patent
Ikeda (10) Patent No.: US 7,131,476 B2
(45) Date of Patent: Nov. 7, 2006

(54) PNEUMATIC TIRE AND METHOD OF MANUFACTURING THE TIRE

(75) Inventor: Ikuji Ikeda, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 78 days.

(21) Appl. No.: 10/466,874

(22) PCT Filed: Sep. 24, 2002

(86) PCT No.: PCT/JP02/09791

§ 371 (c)(1),
(2), (4) Date: Jul. 18, 2003

(87) PCT Pub. No.: WO03/029030

PCT Pub. Date: Apr. 10, 2003

(65) Prior Publication Data

US 2004/0055682 A1 Mar. 25, 2004

(30) Foreign Application Priority Data

Sep. 27, 2001 (JP) .............................. 2001-297252

(51) Int. Cl.
*B29D 30/60* (2006.01)
*B60C 11/00* (2006.01)

(52) U.S. Cl. .............................. 152/209.4; 152/209.8; 152/212; 152/458; 156/117; 156/130

(58) Field of Classification Search ................ 156/117, 156/130, 397; 152/209.4, 209.8, 209.16, 152/212, 458
See application file for complete search history.

(56) References Cited

U.S. PATENT DOCUMENTS

| | | | | |
|---|---|---|---|---|
| 1,537,456 A | * | 5/1925 | Brown | 152/212 |
| 3,177,918 A | * | 4/1965 | Holman | 156/117 |
| 3,308,000 A | * | 3/1967 | Holman | 156/397 |
| 3,607,497 A | * | 9/1971 | Chrobak | 156/117 |
| 6,102,094 A | * | 8/2000 | Matsumoto | 152/209.5 |
| 6,510,881 B1 | * | 1/2003 | Takahashi et al. | 156/117 |
| 6,521,070 B1 | * | 2/2003 | Jonsson et al. | 156/117 |
| 6,575,215 B1 | * | 6/2003 | Hino et al. | 152/209.4 |
| 2002/0069948 A1 | * | 6/2002 | Sentmanat | 152/209.4 |

FOREIGN PATENT DOCUMENTS

| | | | |
|---|---|---|---|
| EP | 0970797 A2 | | 1/2000 |
| EP | 1097825 A2 | | 5/2001 |
| JP | 51-102081 | * | 9/1976 |
| JP | 58-68302 | * | 5/1983 |
| JP | 02212134 A | | 8/1990 |
| JP | 02-274602 | | 11/1990 |
| JP | 07024932 A | | 1/1995 |
| JP | 10-109506 | * | 4/1998 |
| JP | 11048365 A | | 2/1999 |

(Continued)

*Primary Examiner*—Steven D. Maki
(74) *Attorney, Agent, or Firm*—Birch, Stewart, Kolasch & Birch, LLP (57) ABSTRACT

A tread rubber G has a short-fiber-mixed rubber portion 10 forming a grounding surface. In a region Y1 between an outer grounding end Eo and a tire equator C located outside of a vehicle when a tire is mounted to the vehicle, the short fibers f are inclined and oriented at an angle α outward of the vehicle radially outward of the tire, and an angle α1 of the short fibers f in the outer grounding end Eo is greater than an angle α2 of the short fibers f in the tire equator C.

5 Claims, 7 Drawing Sheets

FOREIGN PATENT DOCUMENTS

| | | | |
|---|---|---|---|
| JP | 2001-1718 | * | 1/2001 |
| JP | 2001-138717 | | 5/2001 |
| JP | 2002-210842 | | 7/2002 |
| WO | WO-9706967 A1 | | 2/1997 |

* cited by examiner

Helically Winding direction →

FIG.7

PNEUMATIC TIRE AND METHOD OF MANUFACTURING THE TIRE

This application is the national phase under 35 U.S.C. § 371 of PCT International Application No. PCT/JP02/09791 which has an International filing date of Sep. 24, 2002, which designated the United States of America.

TECHNICAL FIELD

The present invention relates to a pneumatic tire which controls side slip when a vehicle turns a slippery road surface such as an ice road surface or wet road surface, and which enhances steering stability.

BACKGROUND TECHNIQUE

In the case of a winter tire such as studless tire, in order to enhance running performance (hereinafter "on-the-ice performance") on an icy road surface, it is necessary to increase a road surface digging friction or an adhering friction. For this purpose, various researches have been attempted for increasing coefficient of friction of a tread rubber with respect to an icy road surface.

As one of results of researches, it is proposed to blend short fibers into the tread rubber and to orient the short fibers to a radial direction (thickness direction of the tread rubber) of the tire. This proposal has a merit that the road surface digging ability is enhanced by orienting the short fibers in the radial direction, softness of the tire in the thickness direction can be secured due to fine bumps and dips on the road surface and thus, adhering frictional force is also enhanced, and on-the-ice performance can largely be enhanced.

In recent years, as the performance and output of vehicles are enhanced, it is strongly desired to control side slip at the time of turning of the vehicle to enhance on-the-ice performance, and to prevent accidents caused by slipping.

Thereupon, it is a first object of the present invention to provide a pneumatic tire in which short fibers blended with a tread rubber are inclined outward of a vehicle and radially outward of a tire, an inclination angle $\alpha 1$ of the short fibers in a grounding end on an outer side of the vehicle is made greater than an inclination angle $\alpha 2$ of the short fibers of a tire equator and based on this structure, the side slip at the time of turning of the vehicle can largely be controlled, and steering stability on a slippery road surface is enhanced.

It is a second object of the invention to provide a producing method capable of easily forming the pneumatic tire based on an idea of using a long band-like rubber strip in which short fibers are oriented in a direction of the tire width.

DISCLOSURE OF THE INVENTION

An aspect of the invention of the present application provides a pneumatic tire wherein a tread portion comprises a short-fiber-mixed rubber portion made of short-fiber-mixed rubber produced by including short fibers in rubber, said short-fiber-mixed rubber portion forms the tread surface s, in a region between an outer grounding end and a tire equator located outside of a vehicle at least when the tire is mounted to the vehicle, the short fibers are inclined and oriented at substantially an angle of $\alpha$ outward of the vehicle radially outward of the tire, and the angle of the short fibers at the outer grounding end, $\alpha 1$, is greater than the angle of the short fibers, $\alpha 2$, in the tire equator.

At that time, it is preferable that the angle $\alpha 1$ is in a range of 30 to 60°, the angle $\alpha 2$ is in a range of 10 to 35°. It is preferable that an angle $\alpha 3$ of the side slip in the grounding end in a location inside the vehicle when the tire is mounted to the vehicle is 0 to 15° and is smaller than the angle $\alpha 2$ in the tire equator. It is preferable that an outer edge of the short-fiber-mixed rubber portion on the tread surface in the axial direction of the tire is separated from the grounding end by a distance L radially outward of the tire, the distance L is 0.05 to 0.15 times of a width of the tire. It is preferable that in a region between the grounding end and the outer edge of the short-fiber-mixed rubber portion in the axial direction of the tire, an angle $\beta$ of the tread surface with respect to a radial direction of a tangent is in a range of 45 to 90°.

Another aspect of the invention provides a producing method of the pneumatic tire, the short-fiber-mixed rubber portion is formed by a strip winding body obtained by helically winding, on a cylindrical drum, a long band-like rubber strip having a width Wa of 5 to 50 mm and a thickness Ta of 0.5 to 3.0 mm, short fibers of the rubber strip are oriented substantially in a widthwise direction, the rubber strip is helically wound from outside toward inside of the vehicle.

BEST MODE FOR CARRYING OUT THE INVENTION

An embodiment of the present invention will be explained below with reference to the drawings.

Figure 1:
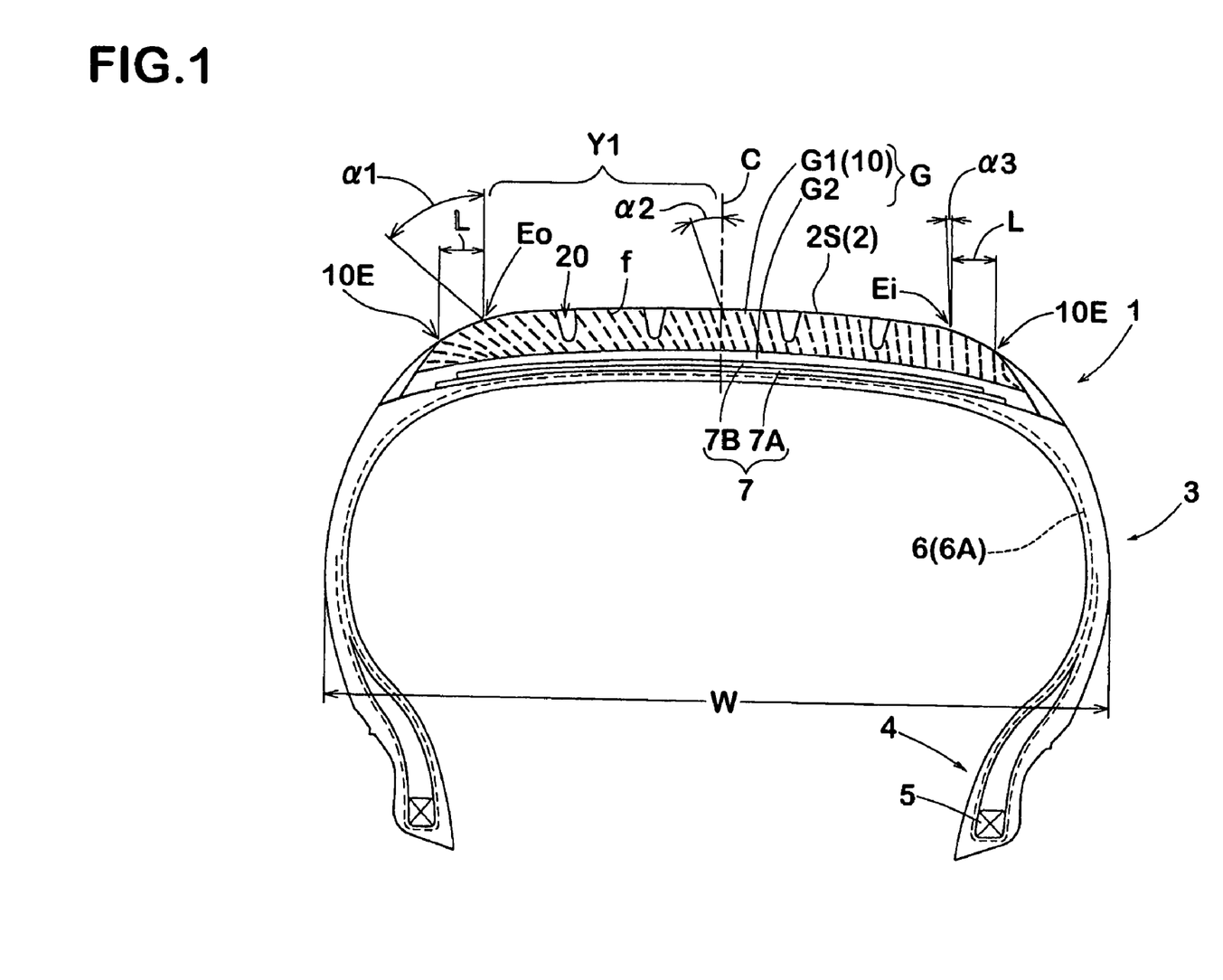
FIG. 1 is a sectional view of a tire according to an embodiment of the present invention.

FIG. 1 is a sectional view of a tire meridian section when a pneumatic tire 1 is formed as a studless tire for a passenger vehicle.

In FIG. 1, the pneumatic tire 1 is reinforced by a cord layer including a carcass 6 which extends from a tread portion 2 to a bead core 5 of a bead portion 4 through a sidewall portion 3, and a belt layer 7 disposed radially outward of the carcass 6 and inward of the tread portion 2.

The carcass 6 comprises one or more (one in this embodiment) carcass ply 6A in which carcass cord is directed at an angle of 75 to 90° with respect to a circumferential direction of the tire. Opposite ends of the carcass ply 6A are folded back around the bead core 5 and retained. The belt layer 7 comprises two or more (two in this embodiment) belt plies 7A and 7B in which strong belt cords such as steel cords are arranged at an angle of 10 to 35° with respect to the circumferential direction of the tire. The belt cords cross between the plies, thereby forming a strong truss structure, and reinforcing the tread portion 2 with hoop stress effect.

Next, a tread rubber G constituting the tread portion 2 includes a short-fiber-mixed rubber portion 10 forming a tread surface 2S. In this embodiment, the tread rubber G has a double layer structure comprising a cap rubber layer G1 forming the tread surface 2S and a base rubber layer G2 located radially inward of the cap rubber layer G1. The cap rubber layer G1 corresponds to the short-fiber-mixed rubber portion 10.

Here, the short-fiber-mixed rubber portion 10 comprises short-fiber-mixed rubber having short fibers f in the rubber. In the short-fiber-mixed rubber, short fibers f having a diameter of 10 to 100 μm and length of 50 to 1000 μm are blended in an amount of 5 to 40 parts by weight with respect to 100 parts by weight of rubber component.

As the short fibers f, organic or inorganic short fibers f such as glass fiber, carbon fiber, aluminum whisker, polyester, nylon, vinylon, aromatic polyamide and the like can be employed. Preferable short fibers are inorganic short fibers f such as glass fiber and carbon fiber having optimal shaping ability by dispersion or mixing during the mixing operation, small softening at a curing temperature at the time of forming during curing, and excellent road surface digging effect.

In the present invention, in order to control the side slip at the time of turning of the vehicle on a slippery road surface, in a region Y1 (hereinafter this region may be referred to as "outer grounding region Y1") between a tire equator C and an outer grounding end Eo located outer side of the vehicle when the tire is mounted to the vehicle, the short fibers f are inclined and oriented at an angle α outward of the vehicle radially outward of the tire. This inclination angle α is increased from the tire equator C toward the outer grounding end Eo and with this, the angle α1 of the short fibers f in the outer grounding end Eo is set greater than the α2 of the short fibers f in the tire equator C ($\alpha 1 > \alpha 2$).

The description that the short fibers f are inclined and oriented substantially outward of the vehicle radially outward of the tire means that 65% or more of the short fibers f are inclined and oriented in the above-described manner. The inclination of the short fibers in the above-described manner is mentioned as outward inclination-orientation in some cases, on the contrary, the inclination-orientation of short fibers which are inclined inward of the vehicle radially outward of the vehicle is mentioned as inward inclination in some cases.

Especially this embodiment shows a case in which the short fibers f are inclined and oriented outward over the substantially entire region of the short-fiber-mixed rubber portion 10. At that time, the angle α of the inclination-orientation is increased from the grounding end Ei toward the outer grounding end Eo in a location inside the vehicle when the tire is mounted to the vehicle. That is, an angle α3 of the short fibers f in the inner grounding end is smaller than the α2 in the tire equator C ($\alpha 1 > \alpha 2 > \alpha 3$).

Figure 2A:
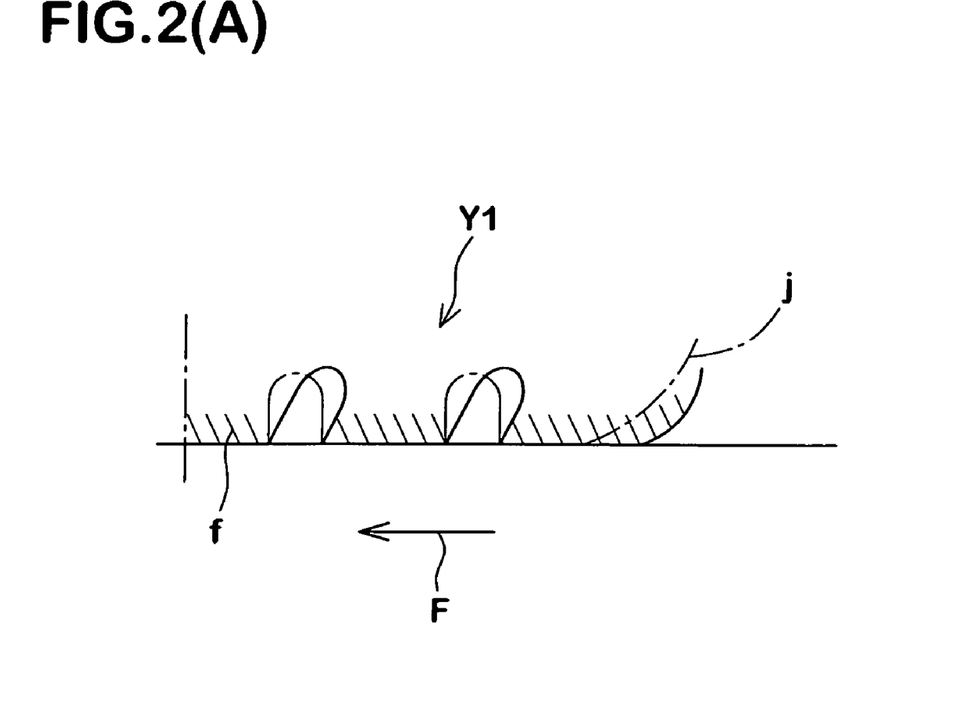
FIGS. 2(A) and (B) are diagrams for explaining working effect of the invention.
Figure 2B:
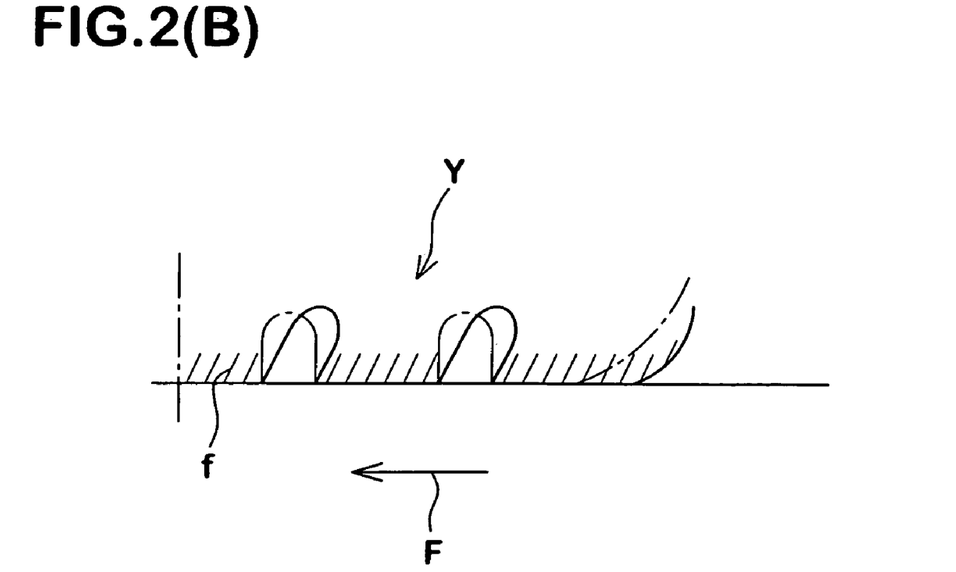

When the vehicle turns, a large lateral force F is applied to an outer tire in radial direction of the turning motion, especially to the outer grounding region Y1 of the tire by a centrifugal force. As shown in FIGS. 2, the tread portion 2 is deformed outward as compared with a shape j at the time of straight running. At that time, if the short fibers f are oriented in the radial direction of the tire, the short fibers f also falls outward at the time of turning of the vehicle as shown in FIG. 2(B). That is, since the short fibers f act in an escaping direction with respect to the lateral force F, the controlling effect with respect to the side slip becomes insufficient.

Whereas, as in the embodiment, when the short fibers f are inclined and oriented outward, as shown in FIG. 2(A), the short fibers f stand at the time of turning of the vehicle, the short fibers f act in a deep angle or inserting direction with respect to the road surface. Therefore, this becomes a large drag with respect to the side slip, and excellent side slip controlling effect can be exhibited.

The reason why the inclination angle α is increased from the inner grounding end Ei to the outer grounding end Eo is that the lateral force F acting when the vehicle turns is increased from the inner grounding end Ei toward the outer grounding end Eo. The angle α is changed in accordance with the varying lateral force, and it is possible to effectively exhibit the side slip controlling effect at the time of turning of the vehicle while highly securing the friction force with respect to the road surface at the time of straight running, i.e., braking and starting performance.

It is preferable that the angle α1 is in a range of 30 to 60°, the angle α2 is in a range of 10 to 35°, and the angle α3 is in a range of 0 to 15° in view of the braking and starting performance and the sides lip controlling effect. If the angles α1, α2 and α3 exceed 60°, 35° and 15°, respectively, the side slip controlling effect is maximized and the braking and starting performance is lowered, and steering stability is deteriorated. If the angles α1, α2 and α3 are smaller than 30°, 15°and 0°, respectively, sufficient side slip controlling effect can not be obtained.

At that time, it is preferable that a difference α1−α2 is 5 to 25°, and a difference α2−α3 is 5 to 20°to make the production process easy.

Values of the angles α1, α2 and α3 respectively mean the average values of inclination angles of short fibers f included in the short-fiber-mixed rubber of unit volume 1 cm$^3$ sampled around the outer grounding end Eo, the tire equator C and the inner grounding end Ei.

Figure 3:
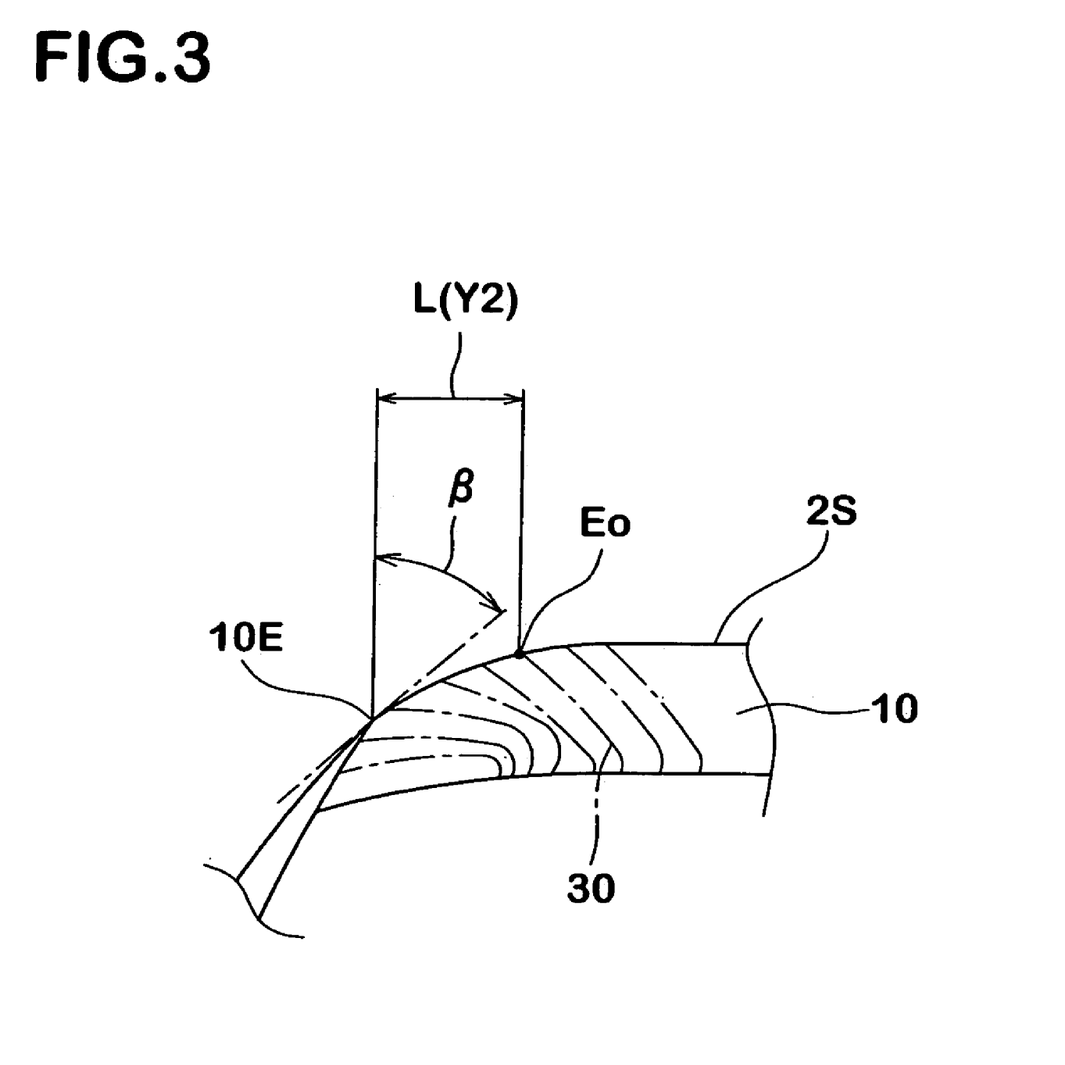
FIG. 3 is an enlarged partial sectional view of an outer grounding end.

Next, since the tread portion 2 falls outward at the time of turning of the vehicle, the grounding is expected also in a portion of the tread surface 2S which is axially outward of the outer grounding end Eo. Therefore, in the embodiment, in order to further enhance the side slip controlling effect, an axially outer edge 10E of the short-fiber-mixed rubber portion 10 is located axially outward of the the grounding end Eo, and a region Y2 of a distance L between the outer edge 10E and the grounding end Eo is constituted as a sub-grounding region Y2 as shown in FIG. 3.

At that time, it is preferable that the distance L is in a range of 0.05 to 0.15 times a tire width W. If the distance L is smaller than 0.05 times, the sub-grounding region Y2 becomes excessively small, and the side slip controlling effect can not be enhanced. If the distance L exceeds 0.15 times, the sub-grounding region Y2 becomes excessively large, which is not preferable from the aspect of costs. The values of distance L and the tire width W are of values of the above-mentioned embodiment tires.

In this embodiment, in order to make it easy for the sub-grounding region Y2 to ground at the time of turning of the vehicle, an angle β of a tangent to the sub-grounding region Y2 with respect to a radial direction of the tread surface 2S is set in a range of 45 to 90°. If the angle β is less than 45°, it becomes difficult for the sub-grounding region Y2 to ground, or the grounding pressure becomes small and the side slip controlling effect can not be enhanced. The angle β is gradually reduced from the outer grounding end Eo toward the outer edge 10E.

Figure 4:
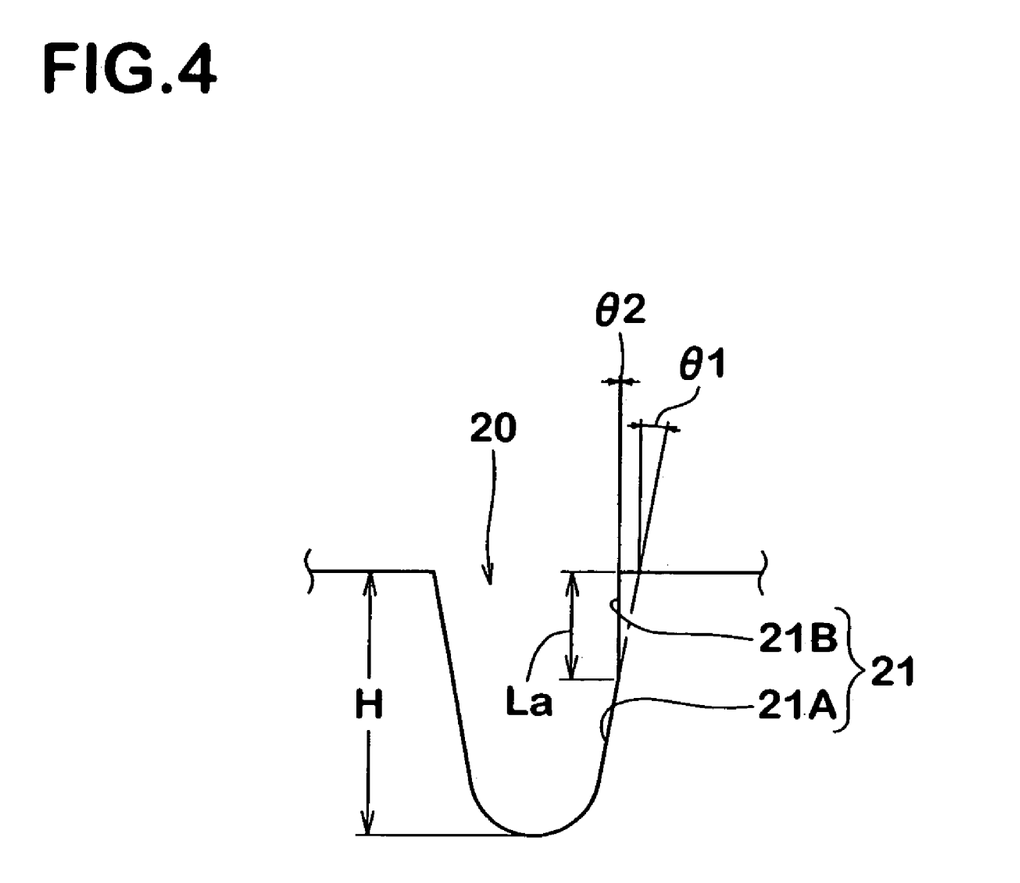
FIG. 4 is a sectional view for explaining a cross section shape of an outer vertical main groove.

In this embodiment, in the outer grounding region Y1, a vertical main groove including a vertical main groove 20 extending in the circumferential direction of the tire along the outer grounding end Eo is disposed. At that time, as shown in FIG. 4, in the cross section of the groove of the outer vertical main groove 20, a groove wall 21 on the side of the tire equator is formed as a curved surface comprising a first groove wall 21A inclining and extending from the groove bottom and a second groove wall 21B extending from a radially outer end thereof to the tread surface 2S at smaller angle than the first groove wall 21A.

An angle θ1 of the first groove wall 21A with respect to a normal of the tread surface 2S is in the conventional range of 5 to 25°. An angle θ2 of the second groove wall 21B is smaller than the angle θ1, and it is preferable that the θ2 is as small as possible, e.g., 0°. A height La of the second groove wall 21B from the tread surface 2S is preferably 0.2 to 0.5 times a groove depth H of the vertical main groove 20. Since the friction of the second groove wall 21B with respect to the road surface becomes large, the second groove wall 21B can be expected to exhibit drag with respect to the side slip, and the side slip controlling effect can further be enhanced with synergism of the above-mentioned inclination-orientation of the short fibers.

A producing method of the pneumatic tire having the short-fiber-mixed rubber portion 10 which is inclined and oriented as described above will be explained below. First, as shown in FIGS. 5 and 6, the short-fiber-mixed rubber portion 10 is formed using a long band-like rubber strip 30 having a width Wa of 5 to 50 mm and a thickness Ta of 0.5 to 3.0 mm.

More specifically, the rubber strip 30 is wound helically on a cylindrical drum, and a strip winding body 31 having a shape close to a finished cross section shape of the short-fiber-mixed rubber portion 10 is formed. In this embodiment, the strip winding body 31 is formed on a base body 32 for a base rubber layer G2 formed by extrusion using a rubber extrusion machine. The finished cross section shape is a cross section shape required when a raw cover of the tire is formed, and is different from a cross section shape in a finished tire after curing.

Figure 5:
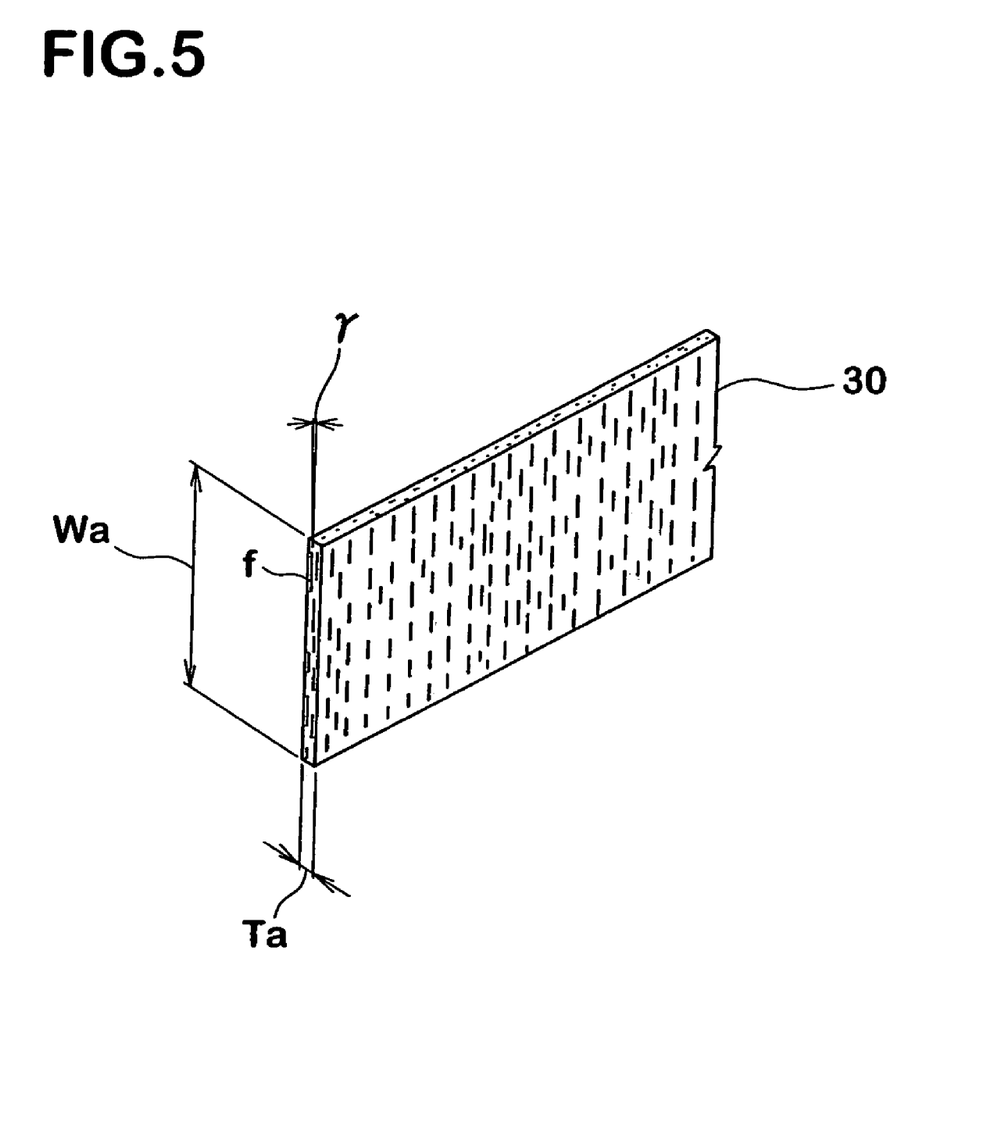
FIG. 5 is a perspective view for explaining a rubber strip.
Figure 6:
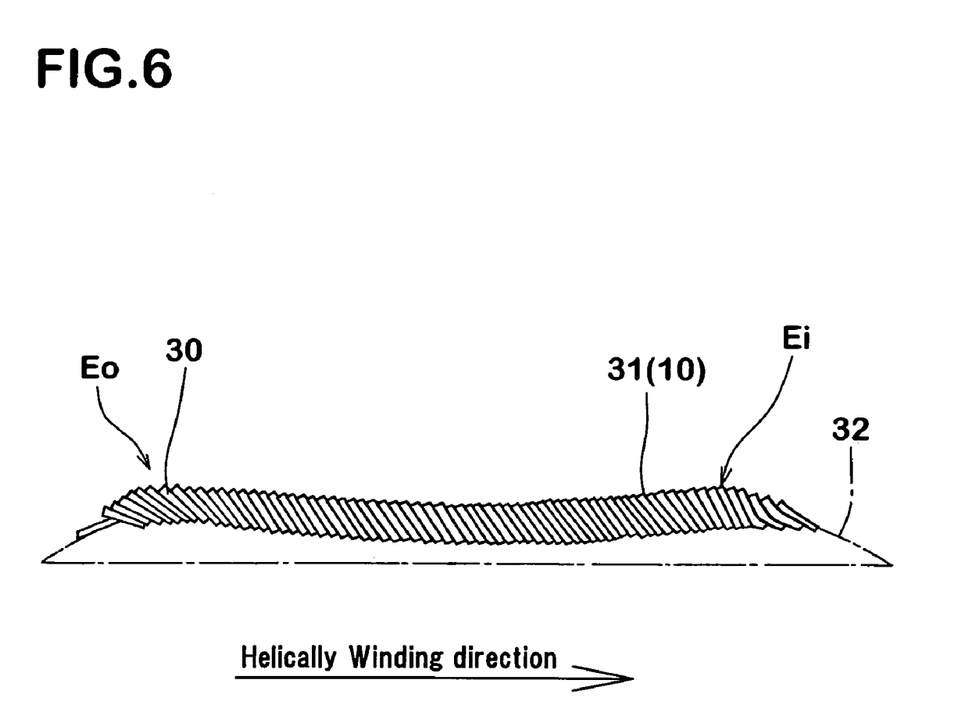
FIG. 6 is a diagram for explaining a producing method of a tread rubber using the rubber strip.
Figure 7:
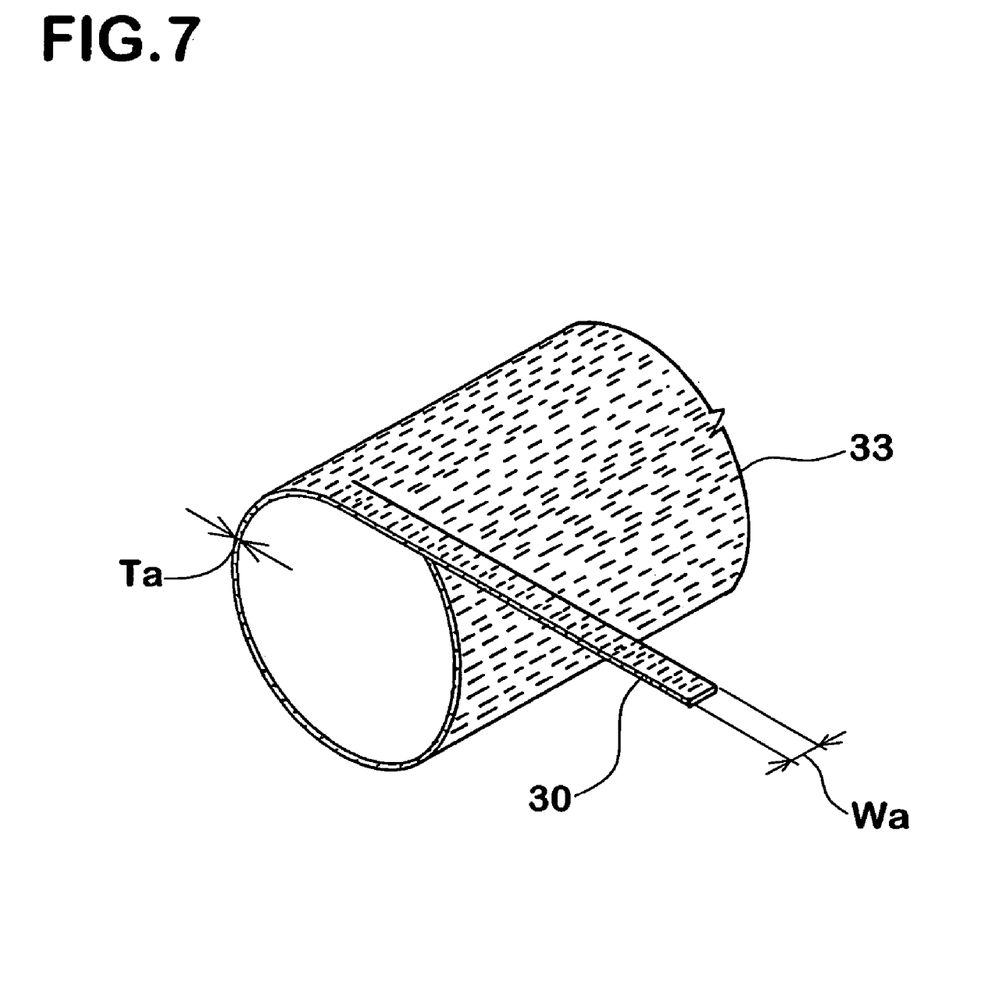
FIG. 7 is a diagram for explaining one example of a forming method of the rubber strip.

An important point here is that the short fibers f of the rubber strip 30 are oriented substantially in the widthwise direction as shown in FIG. 5. That description that the short fibers f are oriented to substantially in the widthwise direction means that 65% or more, preferably 90% or more of the short fibers f are oriented to the widthwise direction at an angle of γ within deviation of 0±15°. As shown in FIG. 7, for example, the rubber strip 30 can be obtained by helically and continuously cutting a extrusion body 33 extruded in a tube-like shape with a thickness Ta and width Wa using a rubber extrusion machine.

By helically winding the rubber strip 30 whose short fibers f are oriented to the widthwise direction in succession from an outer side toward an inner side of the vehicle, thereby forming the strip winding body 31. At that time, since the rubber strip 30 itself is inclined outward of the vehicle radially outward of the tire, the short fibers f are also inclined and oriented outward.

This method is substantially the same as that of the conventional producing method except that the short-fiber-mixed rubber portion 10 is formed of the strip winding body 31. By curing a raw cover of a tire using the strip winding body 31 in a metal mold, the pneumatic tire 1 is formed.

Although the preferable embodiment of the present invention has been described in detail here, the invention is not limited to the illustrated embodiment, and the invention can variously be modified and carried out. That is, the pneumatic tire 1 of the invention can control the side slip not only on an icy road surface but also on a wet road surface. Therefore, the invention can be employed in not only a winter tire such as studless tire or snow tire, but also in tires used for all seasons as well as a summer tire. The pneumatic tire of the invention can be employed in various categories such as small truck tire and heavy loading tire other than the passenger vehicle tire.

[Embodiment]

Tires (size: 205/65R15) for a passenger vehicle having the structure shown in FIG. 1 were prototyped based on the specifications shown in Table 1, and side slip resistance performance (turning performance), and braking and starting performance (straight running performance) of each the prototyped tire was tested and compared with each other. Rubber composition of the cap rubber layer is shown in Table 2.

1) Side Slip Resistance Performance (Turning Performance);

The prototyped tires were mounted to four wheels of a vehicle (2,000 cc/FR vehicle) under conditions of rim (6JJ× 15) and inner pressure (220 kPa), and the vehicle turned and run on an ice surface at a temperature of 0±1° C. (road surface temperature of −3±1° C.) with a turning radius of 25m at 40 km/h. The side slip resistance performance at the time is indicated with indices by a driver's sensory evaluation while determining result of conventional examples as being 100. Higher index shows more excellent result.

2) Braking and Starting Performance (Straight Running Performance);

The starting, accelerating and braking operations were repeated on the ice surface, and the braking and starting performance is indicated with indices by the driver's sensory evaluation while determining result of conventional examples as being 100. Higher index shows more excellent result.

TABLE 1

| | Conventional example | Comparative example 1 | Comparative example 2 | Embodiment 1 | Embodiment 2 | Embodiment 3 | Embodiment 4 |
|---|---|---|---|---|---|---|---|
| Cap rubber (Table 2) | Rubber A | Rubber B | Rubber B | Rubber B | Rubber B | Rubber B | Rubber B |
| Angle of short fibers (degre s) | | | | | | | |
| α1 | — | −30 | 0 | 30 | 40 | 65 | 70 |
| α2 | — | −10 | 0 | 10 | 20 | 35 | 40 |
| α3 | — | −5 | 0 | 5 | 10 | 15 | 25 |
| Distance L (mm) | — | 20 | 20 | 20 | 20 | 20 | 20 |
| Angle β (degrees) of short-fiber-mixed rubber portion at outer edge | — | 60 | 60 | 60 | 60 | 60 | 60 |

TABLE 1-continued

| | Conventional example | Comparative example 1 | Comparative example 2 | Embodiment 1 | Embodiment 2 | Embodiment 3 | Embodiment 4 |
|---|---|---|---|---|---|---|---|
| Side slip resistance performance (turning performance) | 100 | 110 | 120 | 130 | 150 | 155 | 155 |
| Braking and starting performance (straight running performance) | 100 | 125 | 130 | 130 | 125 | 110 | 95 |

TABLE 2

| | Rubber A | Rubber B |
|---|---|---|
| Rubber | | |
| NR | 20 | 20 |
| SBR | 60 | 60 |
| BR | 20 | 20 |
| Carbon black | 40 phr | 40 phr |
| Silica | 6 phr | 6 phr |
| Short fibers | — | Glass fiber |
| Diameter | — | 50 μm |
| Length | — | 200 μm |
| Blending amount | — | 20 phr |

Rubber hardness (Durometer A hardness) after curing is 43°.

As shown in Tables, the test results confirmed that in the tires of the embodiments, the side slip resistance performance was largely enhanced and steering stability on a slippery road surface was enhanced. Especially in the embodiments 1 to 3, excellent side slip resistance performance was exhibited while highly securing the braking and starting performance.

INDUSTRIAL APPLICABILITY

As described above, in the pneumatic tire of the present invention, short fibers to be blended in a tread rubber are inclined outward of a vehicle radially outward of the tire, an inclination angle $\alpha 1$ of the short fibers in the grounding end outward of the vehicle is set greater than an inclination angle $\alpha 2$ of the short fibers in the tire equator. Therefore, it is possible to largely control the side slip at the time of turning of the vehicle, and to enhance the steering stability on a slippery road surface, and the pneumatic tire can suitably be used as a winter tire such as a studless tire.

The invention claimed is:

1. A pneumatic tire having an equator located in a central radial plane axially inward of an outer side of the tire when the tire is mounted on a vehicle, wherein:
   a tread portion of the tire comprises a rubber portion incorporating short fibers, said rubber portion forming the tread surface;
   in a region of the tread portion between an outer grounding end thereof and the tire equator, the short fibers are oriented radially outward and inclined axially outward of the tire;
   the short fibers at the outer grounding end are axially inclined at an angle $\alpha 1$ with respect to the radial direction of the tire, and the short fibers in the tire equator are axially inclined at an angle $\alpha 2$ of 10 to 35° with respect to the radial direction of the tire;
   angle $\alpha 1$ is greater than angle $\alpha 2$; and
   in an inner grounding end, the short fibers are axially inclined at an angle $\alpha 3$ of 0 to 15° with respect to the radial direction of the tire, and $\alpha 3$ is smaller than the angle $\alpha 2$.

2. A pneumatic tire according to claim 1, wherein said angle $\alpha 1$ is in a range of 30 to 60°.

3. A pneumatic tire according to claim 1, wherein an axially outer edge of said rubber portion on the tread surface is separated from the outer grounding end by a distance L axially outward of the tire, and the distance L is 0.05 to 0.15 times of a width of the tire.

4. A pneumatic tire according to claim 1, wherein in a region between the outer grounding end and an axially outer edge of the rubber portion, an angle $\beta$ of a tangent to the tread surface with respect to a radial direction of the tire is in a range of 45 to 90°.

5. A method of producing a pneumatic tire having an equator located in a central radial plane axially inward of an outer side of the tire when the tire is mounted on a vehicle, and wherein a tread portion of the tire comprises a rubber portion incorporating short fibers that are oriented radially outward and inclined axially outward of the tire, the method comprising the steps of:
   incorporating short fibers into a long band-like rubber strip having a width Wa of 5 to 50 mm and a thickness Ta of 0.5 to 3.0 mm, said short fibers being oriented in said rubber strip substantially in the width-wise direction of the rubber strip; and
   forming the rubber portion by helically winding the rubber strip incorporating the short fibers on a cylindrical drum, the winding proceeding in the axial direction of the drum from the outside to the inside of the rubber portion, whereby
   the fibers in the rubber portion exhibit an angle of inclination that increases from the equator to the outer side of the tire;
   the short fibers at the outer grounding end are axially inclined at an angle $\alpha 1$ with respect to the radial direction of the tire, and the short fibers in the tire equator are axially inclined at an angle $\alpha 2$ of 10 to 35° with respect to the radial direction of the tire;
   angle $\alpha 1$ is greater than angle $\alpha 2$; and
   in an inner grounding end, the short fibers are axially inclined at an angle $\alpha 3$ of 0 to 15° with respect to the radial direction of the tire, and $\alpha 3$ is smaller than the angle $\alpha 2$.

* * * * *